United States Patent
Logan et al.

(10) Patent No.: US 10,963,628 B2
(45) Date of Patent: *Mar. 30, 2021

(54) METHOD AND APPARATUS FOR UPDATING A PREVIOUSLY GENERATED TEXT

(71) Applicant: ARRIA DATA2TEXT LIMITED, Aberdeen (GB)

(72) Inventors: Alasdair James Logan, Aberdeen (GB); Ehud Baruch Reiter, Aberdeen (GB)

(73) Assignee: ARRIA DATA2TEXT LIMITED, Aberdeen (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,462

(22) Filed: Sep. 25, 2019

(65) Prior Publication Data

US 2020/0159987 A1    May 21, 2020

Related U.S. Application Data

(63) Continuation of application No. 15/093,365, filed on Apr. 7, 2016, now Pat. No. 10,467,333, which is a
(Continued)

(30) Foreign Application Priority Data

Aug. 30, 2012   (WO) ................. PCT/US2012/053115
Aug. 30, 2012   (WO) ................. PCT/US2012/053127

(51) Int. Cl.
*G06F 17/00*   (2019.01)
*G06F 40/166*  (2020.01)
(Continued)

(52) U.S. Cl.
CPC .......... *G06F 40/166* (2020.01); *G06F 16/353* (2019.01); *G06F 40/14* (2020.01); *G06F 40/20* (2020.01)

(58) Field of Classification Search
CPC .. G06F 40/166; G06F 16/353; G06F 17/2247; G06F 17/211; G06F 40/58
(Continued)

(56) References Cited

U.S. PATENT DOCUMENTS 5,181,250 A    1/1993  Morgan et al.
5,237,502 A    8/1993  White et al.
(Continued)

FOREIGN PATENT DOCUMENTS

AU    2011247830 B2   12/2011
AU    2011253627 B2   12/2011
(Continued)

OTHER PUBLICATIONS

U.S. Appl. No. 15/093,365, filed Apr. 7, 2016, U.S. Pat. No. 10,467,333, Patented.
(Continued)

*Primary Examiner* — Manglesh M Patel
(74) *Attorney, Agent, or Firm* — Alston & Bird LLP

(57) ABSTRACT

Methods, apparatuses, and computer program products are described herein that are configured to enable updating of an output text. In some example embodiments, a method is provided that comprises generating a new message for each updateable data element based on a predetermined indication. The method of this embodiment may also include determining a classification for each new message by comparing each new message with a corresponding message that describes the updateable data element. The method of this embodiment may also include generating an additional document plan tree that contains at least a portion of the new messages. The method of this embodiment may also include combining the additional document plan tree with an original document plan tree.

20 Claims, 7 Drawing Sheets

Related U.S. Application Data continuation of application No. 14/634,158, filed on Feb. 27, 2015, now Pat. No. 9,336,193, which is a continuation of application No. PCT/US2012/061051, filed on Oct. 19, 2012.

(51) Int. Cl.
  *G06F 16/35* (2019.01)
  *G06F 40/14* (2020.01)
  *G06F 40/20* (2020.01)

(58) Field of Classification Search
  USPC .............................. 715/200, 256, 234, 264
  See application file for complete search history.

(56) References Cited

U.S. PATENT DOCUMENTS

| | | |
|---|---|---|
| 5,311,429 A | 5/1994 | Tominaga |
| 5,321,608 A | 6/1994 | Inamba et al. |
| 5,629,687 A | 5/1997 | Sutton et al. |
| 5,794,177 A | 8/1998 | Carus et al. |
| 5,802,488 A | 9/1998 | Edatsune |
| 6,023,669 A | 2/2000 | Suda et al. |
| 6,078,914 A | 6/2000 | Redfern |
| 6,138,087 A | 10/2000 | Budzinski |
| 6,266,617 B1 | 7/2001 | Evans |
| 6,374,224 B1 | 4/2002 | Horiguchi et al. |
| 6,442,485 B2 | 8/2002 | Evans |
| 6,466,899 B1 | 10/2002 | Yano et al. |
| 6,665,640 B1 | 12/2003 | Bennett et al. |
| 6,668,281 B1 | 12/2003 | Ayyadurai |
| 6,717,513 B1 | 4/2004 | Sandelman et al. |
| 6,947,885 B2 | 9/2005 | Bangalore et al. |
| 7,043,420 B2 | 5/2006 | Ratnaparkhi |
| 7,167,824 B2 | 1/2007 | Kallulli |
| 7,231,341 B2 | 6/2007 | Bangalore et al. |
| 7,238,313 B2 | 7/2007 | Ferencz et al. |
| 7,305,336 B2 | 12/2007 | Polanyi et al. |
| 7,310,969 B2 | 12/2007 | Dale |
| 7,346,493 B2 | 3/2008 | Ringger et al. |
| 7,418,447 B2 | 8/2008 | Caldwell et al. |
| 7,424,363 B2 | 9/2008 | Cheng et al. |
| 7,444,287 B2 | 10/2008 | Claudatos et al. |
| 7,490,042 B2 | 2/2009 | Eide et al. |
| 7,496,621 B2 | 2/2009 | Pan et al. |
| 7,526,424 B2 | 4/2009 | Corston-Oliver et al. |
| 7,533,089 B2 | 5/2009 | Pan et al. |
| 7,562,005 B1 | 7/2009 | Bangalore et al. |
| 7,684,991 B2 | 3/2010 | Stohr et al. |
| 7,711,581 B2 | 5/2010 | Hood et al. |
| 7,783,486 B2 | 8/2010 | Rosser et al. |
| 7,809,552 B2 | 10/2010 | Pan et al. |
| 7,849,048 B2 | 12/2010 | Langseth et al. |
| 7,849,049 B2 | 12/2010 | Langseth et al. |
| 7,856,390 B2 | 12/2010 | Schiller |
| 7,873,509 B1 | 1/2011 | Budzinski |
| 7,921,091 B2 | 4/2011 | Cox et al. |
| 7,930,169 B2 | 4/2011 | Billerey-Mosier |
| 7,933,774 B1 | 4/2011 | Begeja et al. |
| 7,966,172 B2 | 6/2011 | Ruiz et al. |
| 7,970,601 B2 | 6/2011 | Burmester et al. |
| 7,979,267 B2 | 7/2011 | Ruiz et al. |
| 8,019,610 B2 | 9/2011 | Walker et al. |
| 8,024,331 B2 | 9/2011 | Calistri-Yeh et al. |
| 8,037,000 B2 | 10/2011 | Delmonico et al. |
| 8,082,144 B1 | 12/2011 | Brown et al. |
| 8,090,727 B2 | 1/2012 | Lachtarnik et al. |
| 8,150,676 B1 | 4/2012 | Kaeser |
| 8,175,873 B2 | 5/2012 | Di Fabbrizio et al. |
| 8,180,647 B2 | 5/2012 | Walker et al. |
| 8,180,758 B1 | 5/2012 | Cornali |
| 8,229,937 B2 | 7/2012 | Kiefer et al. |
| 8,355,903 B1 | 1/2013 | Birnbaum et al. |
| 8,374,848 B1 | 2/2013 | Birnbaum et al. |
| 8,425,325 B2 | 4/2013 | Hope |
| 8,473,911 B1 | 6/2013 | Baxter |
| 8,494,944 B2 | 7/2013 | Schiller |
| 8,495,675 B1 | 7/2013 | Philpott et al. |
| 8,515,733 B2 | 8/2013 | Jansen |
| 8,515,737 B2 | 8/2013 | Allen |
| 8,548,814 B2 | 10/2013 | Manuel-Devadoss |
| 8,548,915 B2 | 10/2013 | Antebi et al. |
| 8,561,014 B2 | 10/2013 | Mengusoglu et al. |
| 8,566,090 B2 | 10/2013 | Di Fabbrizio et al. |
| 8,589,148 B2 | 11/2013 | Atallah et al. |
| 8,589,172 B2 | 11/2013 | Alonso et al. |
| 8,616,896 B2 | 12/2013 | Lennox |
| 8,620,669 B2 | 12/2013 | Walker et al. |
| 8,626,613 B2 | 1/2014 | Dale et al. |
| 8,630,844 B1 | 1/2014 | Nichols et al. |
| 8,655,889 B2 | 2/2014 | Hua et al. |
| 8,676,691 B2 | 3/2014 | Schiller |
| 8,688,434 B1 | 4/2014 | Birnbaum et al. |
| 8,700,396 B1 | 4/2014 | Mengibar et al. |
| 8,738,384 B1 | 5/2014 | Bansal et al. |
| 8,738,558 B2 | 5/2014 | Antebi et al. |
| 8,762,134 B2 | 5/2014 | Reiter |
| 8,762,133 B2 | 6/2014 | Reiter |
| 8,775,161 B1 | 7/2014 | Nichols et al. |
| 8,825,533 B2 | 9/2014 | Basson et al. |
| 8,843,363 B2 | 9/2014 | Birnbaum et al. |
| 8,849,670 B2 | 9/2014 | Di Cristo et al. |
| 8,886,520 B1 | 11/2014 | Nichols et al. |
| 8,892,417 B1 | 11/2014 | Nichols et al. |
| 8,892,419 B2 | 11/2014 | Lundberg et al. |
| 8,898,063 B1 | 11/2014 | Sykes et al. |
| 8,903,711 B2 | 12/2014 | Lundberg et al. |
| 8,903,718 B2 | 12/2014 | Akuwudike |
| 8,909,595 B2 | 12/2014 | Gandy et al. |
| 8,914,452 B2 | 12/2014 | Boston et al. |
| 8,924,330 B2 | 12/2014 | Antebi et al. |
| 8,930,305 B2 | 1/2015 | Namburu et al. |
| 8,977,953 B1 | 3/2015 | Pierre et al. |
| 8,984,051 B2 | 3/2015 | Olsen et al. |
| 9,002,695 B2 | 4/2015 | Watanabe et al. |
| 9,002,869 B2 | 4/2015 | Riezler et al. |
| 9,015,730 B1 | 4/2015 | Allen et al. |
| 9,028,260 B2 | 5/2015 | Nanjiani et al. |
| 9,092,276 B2 | 7/2015 | Allen et al. |
| 9,104,720 B2 | 8/2015 | Rakshit et al. |
| 9,110,882 B2 | 8/2015 | Overell et al. |
| 9,110,977 B1 | 8/2015 | Pierre et al. |
| 9,111,534 B1 | 8/2015 | Sylvester et al. |
| 9,135,244 B2 | 9/2015 | Reiter |
| 9,135,662 B2 | 9/2015 | Evenhouse et al. |
| 9,146,904 B2 | 9/2015 | Allen |
| 9,164,982 B1 | 10/2015 | Kaeser |
| 9,190,054 B1 | 11/2015 | Riley et al. |
| 9,208,147 B1 | 12/2015 | Nichols et al. |
| 9,229,927 B2 | 1/2016 | Wolfram et al. |
| 9,240,197 B2 | 1/2016 | Begeja et al. |
| 9,244,894 B1 | 1/2016 | Dale et al. |
| 9,251,134 B2 | 2/2016 | Birnbaum et al. |
| 9,251,143 B2 | 2/2016 | Bird et al. |
| 9,263,039 B2 | 2/2016 | Di Cristo et al. |
| 9,268,770 B1 | 2/2016 | Kursun |
| 9,323,743 B2 | 4/2016 | Reiter |
| 9,336,193 B2 | 5/2016 | Logan et al. |
| 9,405,448 B2 | 8/2016 | Reiter |
| 9,600,471 B2 | 3/2017 | Bradshaw et al. |
| 9,640,045 B2 | 5/2017 | Reiter |
| 9,754,051 B2 | 9/2017 | Bastide et al. |
| 9,990,360 B2 | 6/2018 | Sripada |
| 10,026,274 B2 | 7/2018 | Reiter |
| 10,115,202 B2 | 10/2018 | Sripada |
| 10,255,252 B2 | 4/2019 | Dale et al. |
| 10,282,878 B2 | 5/2019 | Reiter |
| 10,467,333 B2 | 11/2019 | Logan et al. |
| 10,504,338 B2 | 12/2019 | Reiter |
| 10,565,308 B2 | 2/2020 | Reiter |
| 2002/0026306 A1 | 2/2002 | Bangalore et al. |
| 2003/0131315 A1 | 7/2003 | Escher |
| 2003/0212545 A1 | 11/2003 | Kallulli |
| 2004/0246120 A1 | 12/2004 | Benner et al. |

(56) References Cited

U.S. PATENT DOCUMENTS

| | | |
|---|---|---|
| 2005/0039107 A1 | 2/2005 | Hander et al. |
| 2005/0228635 A1 | 10/2005 | Araki et al. |
| 2005/0256703 A1 | 11/2005 | Markel |
| 2006/0020886 A1 | 1/2006 | Agrawal et al. |
| 2006/0085667 A1 | 4/2006 | Kubota et al. |
| 2006/0178868 A1 | 8/2006 | Billerey-Mosier |
| 2006/0229872 A1 | 10/2006 | Eide et al. |
| 2006/0259293 A1 | 11/2006 | Orwant |
| 2007/0078655 A1 | 4/2007 | Semkow et al. |
| 2007/0106628 A1 | 5/2007 | Adjali et al. |
| 2007/0129942 A1 | 6/2007 | Ban et al. |
| 2007/0136301 A1 | 6/2007 | Jardin |
| 2007/0143099 A1 | 6/2007 | Balchandran et al. |
| 2008/0077653 A1 | 3/2008 | Morris |
| 2008/0221865 A1 | 9/2008 | Wellmann |
| 2008/0221870 A1 | 9/2008 | Attardi et al. |
| 2008/0281781 A1 | 11/2008 | Zhao et al. |
| 2008/0312954 A1 | 12/2008 | Ullrich et al. |
| 2009/0089100 A1 | 4/2009 | Nenov et al. |
| 2009/0089126 A1 | 4/2009 | Odubiyi |
| 2009/0111486 A1 | 4/2009 | Burstrom |
| 2009/0156229 A1 | 6/2009 | Hein et al. |
| 2009/0198496 A1 | 8/2009 | Denecke |
| 2009/0281839 A1 | 11/2009 | Lynn et al. |
| 2009/0286514 A1 | 11/2009 | Lichorowic et al. |
| 2009/0287567 A1 | 11/2009 | Penberthy et al. |
| 2009/0313240 A1 | 12/2009 | Gile et al. |
| 2010/0146491 A1 | 6/2010 | Hirano et al. |
| 2010/0153095 A1 | 6/2010 | Yang et al. |
| 2010/0174545 A1 | 7/2010 | Otani |
| 2010/0191658 A1 | 7/2010 | Kannan et al. |
| 2010/0203970 A1 | 8/2010 | Hope |
| 2010/0313149 A1 | 12/2010 | Zhang et al. |
| 2010/0332235 A1 | 12/2010 | David |
| 2011/0010164 A1 | 1/2011 | Williams |
| 2011/0068929 A1 | 3/2011 | Franz et al. |
| 2011/0087486 A1 | 4/2011 | Schiller |
| 2011/0160986 A1 | 6/2011 | Wu et al. |
| 2011/0179006 A1 | 7/2011 | Cox et al. |
| 2011/0218822 A1 | 9/2011 | Buisman et al. |
| 2011/0225185 A1 | 9/2011 | Gupta |
| 2011/0257839 A1 | 10/2011 | Mukherjee |
| 2012/0078888 A1 | 3/2012 | Brown et al. |
| 2012/0084027 A1 | 4/2012 | Caine |
| 2012/0136649 A1 | 5/2012 | Freising et al. |
| 2012/0158089 A1 | 6/2012 | Bocek et al. |
| 2012/0173475 A1 | 7/2012 | Ash et al. |
| 2012/0290289 A1 | 11/2012 | Manera et al. |
| 2012/0310990 A1 | 12/2012 | Viegas et al. |
| 2013/0030810 A1 | 1/2013 | Kopparapu et al. |
| 2013/0066873 A1 | 3/2013 | Salvetti et al. |
| 2013/0144606 A1 | 6/2013 | Birnbaum et al. |
| 2013/0145242 A1 | 6/2013 | Birnbaum et al. |
| 2013/0145255 A1 | 6/2013 | Birnbaum et al. |
| 2013/0151238 A1 | 6/2013 | Beaurpere et al. |
| 2013/0174026 A1 | 7/2013 | Locke |
| 2013/0185050 A1 | 7/2013 | Bird et al. |
| 2013/0211855 A1 | 8/2013 | Eberle et al. |
| 2013/0238329 A1 | 9/2013 | Casella dos Santos |
| 2013/0238330 A1 | 9/2013 | Casella dos Santos |
| 2013/0238987 A1 | 9/2013 | Lutwyche |
| 2013/0251233 A1 | 9/2013 | Yang et al. |
| 2013/0268263 A1 | 10/2013 | Park et al. |
| 2013/0293363 A1 | 11/2013 | Plymouth et al. |
| 2013/0311201 A1 | 11/2013 | Chatfield et al. |
| 2014/0019531 A1 | 1/2014 | Czajka et al. |
| 2014/0025371 A1 | 1/2014 | Min |
| 2014/0039878 A1 | 2/2014 | Wasson |
| 2014/0052696 A1 | 2/2014 | Soroushian |
| 2014/0062712 A1 | 3/2014 | Reiter |
| 2014/0067377 A1 | 3/2014 | Reiter |
| 2014/0072947 A1 | 3/2014 | Boguraev et al. |
| 2014/0072948 A1 | 3/2014 | Boguraev et al. |
| 2014/0089212 A1 | 3/2014 | Sbodio |
| 2014/0100846 A1 | 4/2014 | Haine et al. |
| 2014/0100901 A1 | 4/2014 | Haine et al. |
| 2014/0100923 A1 | 4/2014 | Strezo et al. |
| 2014/0143720 A1 | 5/2014 | Dimarco et al. |
| 2014/0149107 A1 | 5/2014 | Schilder |
| 2014/0149596 A1 | 5/2014 | Emerson, III |
| 2014/0164303 A1 | 6/2014 | Bagchi et al. |
| 2014/0164304 A1 | 6/2014 | Bagchi et al. |
| 2014/0188477 A1 | 7/2014 | Zhang |
| 2014/0278358 A1 | 9/2014 | Byron et al. |
| 2014/0281935 A1 | 9/2014 | Byron et al. |
| 2014/0281951 A1 | 9/2014 | Megiddo et al. |
| 2014/0297268 A1 | 10/2014 | Govrin et al. |
| 2014/0316768 A1 | 10/2014 | Khandekar |
| 2014/0375466 A1 | 12/2014 | Reiter |
| 2014/0379322 A1 | 12/2014 | Koutrika et al. |
| 2014/0379378 A1 | 12/2014 | Cohen-Solal et al. |
| 2015/0006437 A1 | 1/2015 | Byron et al. |
| 2015/0032443 A1 | 1/2015 | Karov et al. |
| 2015/0081299 A1 | 3/2015 | Jasinschi et al. |
| 2015/0081307 A1 | 3/2015 | Cederstrom et al. |
| 2015/0081321 A1 | 3/2015 | Jain |
| 2015/0095015 A1 | 4/2015 | Lani et al. |
| 2015/0106307 A1 | 4/2015 | Antebi et al. |
| 2015/0142418 A1 | 5/2015 | Byron et al. |
| 2015/0142421 A1 | 5/2015 | Buurman et al. |
| 2015/0154359 A1 | 6/2015 | Harris et al. |
| 2015/0163358 A1 | 6/2015 | Klemm et al. |
| 2015/0169522 A1 | 6/2015 | Logan et al. |
| 2015/0169548 A1 | 6/2015 | Reiter |
| 2015/0169659 A1 | 6/2015 | Lee et al. |
| 2015/0169720 A1 | 6/2015 | Byron et al. |
| 2015/0169737 A1 | 6/2015 | Bryon et al. |
| 2015/0179082 A1 | 6/2015 | Byron et al. |
| 2015/0227508 A1 | 8/2015 | Howald et al. |
| 2015/0242384 A1 | 8/2015 | Reiter |
| 2015/0261744 A1 | 9/2015 | Suenbuel et al. |
| 2015/0261836 A1 | 9/2015 | Madhani et al. |
| 2015/0279348 A1 | 10/2015 | Cao et al. |
| 2015/0310013 A1 | 10/2015 | Allen et al. |
| 2015/0310112 A1 | 10/2015 | Allen et al. |
| 2015/0310861 A1 | 10/2015 | Waltermann et al. |
| 2015/0324343 A1 | 11/2015 | Carter et al. |
| 2015/0324351 A1 | 11/2015 | Sripada et al. |
| 2015/0324374 A1 | 11/2015 | Sripada et al. |
| 2015/0324413 A1 | 11/2015 | Gubin et al. |
| 2015/0326622 A1 | 11/2015 | Carter et al. |
| 2015/0331845 A1 | 11/2015 | Guggilla et al. |
| 2015/0331846 A1 | 11/2015 | Guggilla et al. |
| 2015/0332670 A1 | 11/2015 | Akbacak et al. |
| 2015/0356127 A1 | 12/2015 | Pierre et al. |
| 2015/0363363 A1 | 12/2015 | Bohra et al. |
| 2015/0363364 A1 | 12/2015 | Sripada |
| 2015/0363382 A1 | 12/2015 | Bohra et al. |
| 2015/0363390 A1 | 12/2015 | Mungi et al. |
| 2015/0363391 A1 | 12/2015 | Mungi et al. |
| 2015/0371651 A1 | 12/2015 | Aharoni et al. |
| 2016/0019200 A1 | 1/2016 | Allen |
| 2016/0027125 A1 | 1/2016 | Bryce |
| 2016/0055150 A1 | 2/2016 | Bird et al. |
| 2016/0179755 A1 | 6/2016 | Desai et al. |
| 2016/0328385 A1 | 11/2016 | Reiter |

FOREIGN PATENT DOCUMENTS

| | | |
|---|---|---|
| AU | 2013201755 A1 | 9/2013 |
| AU | 2013338351 A1 | 5/2015 |
| CA | 2577721 C | 3/2006 |
| CA | 2826116 C | 3/2006 |
| CN | 103999081 A | 8/2014 |
| CN | 104182059 A | 12/2014 |
| CN | 104881320 A | 9/2015 |
| EP | 1336955 B1 | 5/2006 |
| EP | 2707809 A1 | 3/2014 |
| EP | 2750759 A1 | 7/2014 |
| EP | 2849103 A2 | 3/2015 |
| GB | 2518192 A | 3/2015 |
| JP | 61-221873 A | 10/1986 |
| JP | 2004-21791 | 1/2004 |
| JP | 2014165766 A | 9/2014 |

(56) References Cited

FOREIGN PATENT DOCUMENTS

| | | | |
|---|---|---|---|
| WO | WO 2000/074394 A2 | 12/2000 | |
| WO | WO 2002/031628 A2 | 4/2002 | |
| WO | WO 2002/073449 A1 | 9/2002 | |
| WO | WO 2002/073531 A1 | 9/2002 | |
| WO | WO 2002/031628 A3 | 10/2002 | |
| WO | WO 2006/010044 A2 | 1/2006 | |
| WO | WO 2007/041221 A1 | 4/2007 | |
| WO | WO 2009/014465 A2 | 1/2009 | |
| WO | WO 2010/049925 A2 | 5/2010 | |
| WO | WO 2010/051404 A1 | 5/2010 | |
| WO | WO 2012/071571 A2 | 5/2012 | |
| WO | WO 2013/009613 A1 | 1/2013 | |
| WO | WO 2013/042115 A2 | 3/2013 | |
| WO | WO 2013/042116 A1 | 3/2013 | |
| WO | WO 2013/177280 A1 | 11/2013 | |
| WO | WO 2014/035402 A1 | 3/2014 | |
| WO | WO 2014/098560 A2 | 6/2014 | |
| WO | WO 2014/140977 A1 | 9/2014 | |
| WO | WO 2014/187076 A1 | 11/2014 | |
| WO | WO 2015/028844 A1 | 3/2015 | |
| WO | WO 2015/113301 A1 | 8/2015 | |
| WO | WO 2015/148278 A1 | 10/2015 | |
| WO | WO 2015/159133 A1 | 10/2015 | |
| WO | WO 2015/164253 A1 | 10/2015 | |
| WO | WO 2015/175338 A1 | 11/2015 | |
| WO | WO 2016/004266 A2 | 1/2016 | |

OTHER PUBLICATIONS

U.S. Appl. No. 14/634,158, filed Feb. 27, 2015, U.S. Pat. No. 9,336,193, Patented.

Alawneh et al., "Pattern Recognition Techniques Applied to the Abstraction of Traces of Inter-Process Communication," Software Maintenance and Reengineering (CSMR), 2011 15th European Conference on Year: 2011, IEEE Conference Publications (2011) pp. 211-220, (2011).

Andre et al., "From Visual Data to Multimedia Presentations," Grounding Representations: Integration of Sensory Information in Natural Language Processing, Artificial Intelligence and Neural networks, IEE Colloquium On, pp. 1-3, (1995).

Andre et al., "Natural Language Access to Visual Data: Dealing with Space and Movement," Report 63, German Research Center for Artificial Intellience (DFKI) SFB 314, Project VITRA, pp. 1-21, (1989).

Barzilay et al., "Aggregation via Set Partitioning for Natural Language Generation" Proceedings of the Human Language Technology Conference of the North American Chapter of the ACL; pp. 359-366; (2006).

Bhoedjang, et al., "Optimizing Distributed Data Structures Using Application-Specific Network Interface Software," Parallel Processing, Proceedings; International Conference on Year: 1998, IEEE Conference Publications pp. 485-492, (1998).

Cappozzo et al., "Surface-Marker Cluster Design Criteria for 3-D Bone Movement Reconstruction," IEEE Transactions on Biomedical Engineering, 44(12):1165-1174, (1997).

Dalianis et al.; "Aggregation in Natural Language Generation;" Trends in Natural Language Generation, an Artificial Intelligence Perspective; pp. 88-105; (1993).

Dragon et al., "Multi-Scale Clustering of Frame-to-Frame Correspondences for Motion Segmentation," Computer Vision ECCV, Springer Berlin Heidelberg, pp. 445-458, (2012).

Gatt et al.,"From Data to Text in the Neonatal Intensive Care Unit: Using NLG Technology for Decision Support and Information Management," AI Communication, pp. 153-186, (2009).

Gorelov "Search Optimization in Semistructured Databases Using Hierarchy of Document Schemas," Programming and Computer Software, 31(6):321-331, (2005).

Herzog et al., "Combining Alternatives in the Multimedia Presentation of Decision Support Information for Real-Time Control," IFIP, 15 pages,(1998).

Kottke et al., "Motion Estimation via Cluster Matching," 8180 IEEE Transactions on Pattern Analysis and Machine Intelligence, 16(11):1128-1132, (1994).

Kukich, "Knowledge-Based Report Generation: A Knowledge-Engineering Approach to Natural Language Report Generation," Dissertation to The Interdisciplinary Department of Information Science, University of Pittsburg, 260 pages, (1983).

Leonov et al., "Construction of an Optimal Relational Schema for Storing XML Documents in an RDBMS Without Using DTD/XML Schema," Programming and Computer Software, 30(6):323-336, (2004).

Perry et al., "Automatic Realignment of Data Structures to Improve MPI Performance," Networks (ICN), Ninth International Conference on Year: 2010, IEEE Conference Publications, pp. 42-47, (2010).

Quinlan, "Induction of Decision Trees," Machine Learning, Kluwer Academic Publishers, 1(1):81-106, (1986).

Radev et al.,"Generating Natural Language Summaries from Multiple On-Line Sources," Association of Computational Linguistics, 24(3):469-500, (1998).

Reiter et al., "Building Applied Natural Language Generation Systems," Natural Language Engineering 1 (1), 31 pages, (1995).

Reiter et al.; "Studies in Natural Language Processing—Building Natural Language Generation Systems," Cambridge University Press, (2000).

Reiter, "An Architecture for Data-to-Text Systems," Proceedings of ENLG-2007, pp. 97-104, (2007).

Shaw, "Clause Aggregation Using Linguistic Knowledge;" Proceedings of IWNLG, pp. 138-147, (1998). Retrieved from <http://acl.ldc.upenn.edu/W/W98/W98-1415.pdf>.

Spillner et al., "Algorithms for Dispersed Processing," Utility and Cloud Computing (UC), 204 IEEE/ACM 7th International Conference on Year: 2014, IEEE Conferenced Publications, pp. 914-921, (2014).

Voelz et al., "Rocco: A RoboCup Soccer Commentator System," German Research Center for Artificial Intelligence DFKI GmbH, 11 pages, (1999).

Yu et al., "Choosing the Content of Textual Summaries of Large Time-Series Data Sets," Natural Language Engineering, 13:1-28, (2007).

International Preliminary Report on Patentability for Application No. PCT/IB2012/056513 dated May 19, 2015.

International Preliminary Report on Patentability for Application No. PCT/IB2012/056514 dated May 19, 2015.

International Preliminary Report on Patentability for Application No. PCT/IB2012/057773 dated Jun. 30, 2015.

International Preliminary Report on Patentability for Application No. PCT/IB2012/057774 dated Jun. 30, 2015.

International Preliminary Report on Patentability for Application No. PCT/IB2013/050375 dated Jul. 21, 2015.

International Preliminary Report on Patentability for Application No. PCT/IB2013/058131 dated May 5, 2015.

International Preliminary Report on Patentability for Application No. PCT/IB2014/060846 dated Oct. 18, 2016.

International Preliminary Report on Patentability for Application No. PCT/US2012/053115 dated Mar. 3, 2015.

International Preliminary Report on Patentability for Application No. PCT/US2012/053127 dated Mar. 3, 2015.

International Preliminary Report on Patentability for Application No. PCT/US2012/053128 dated Mar. 3, 2015.

International Preliminary Report on Patentability for Application No. PCT/US2012/053156 dated Mar. 3, 2015.

International Preliminary Report on Patentability for Application No. PCT/US2012/053183 dated Mar. 3, 2015.

International Preliminary Report on Patentability for Application No. PCT/US2012/061051 dated Mar. 3, 2015.

International Preliminary Report on Patentability for Application No. PCT/US2012/063343 dated May 5, 2015.

International Search Report and Written Opinion for Application No. PCT/IB2012/056513 dated Jun. 26, 2013.

International Search Report and Written Opinion for Application No. PCT/IB2012/056514 dated Jun. 26, 2013.

(56) References Cited

OTHER PUBLICATIONS

International Search Report and Written Opinion for Application No. PCT/IB2012/057773 dated Jul. 1, 2013.
International Search Report and Written Opinion for Application No. PCT/IB2012/057774 dated Sep. 20, 2013.
International Search Report and Written Opinion for Application No. PCT/IB2013/050375 dated May 7, 2013.
International Search Report and Written Opinion for Application No. PCT/IB2013/058131 dated Jul. 3, 2014.
International Search Report and Written Opinion for Application No. PCT/IB2014/060846 dated Feb. 4, 2015.
International Search Report and Written Opinion for Application No. PCT/US2012/053115 dated Jul. 24, 2013.
International Search Report and Written Opinion for Application No. PCT/US2012/053127 dated Jul. 24, 2013.
International Search Report and Written Opinion for Application No. PCT/US2012/053128 dated Jun. 27, 2013.
International Search Report and Written Opinion for Application No. PCT/US2012/053156 dated Sep. 26, 2013.
International Search Report and Written Opinion for Application No. PCT/US2012/053183 dated Jun. 4, 2013.
International Search Report and Written Opinion for Application No. PCT/US2012/061051 dated Jul. 24, 2013. 422
International Search Report and Written Opinion for Application No. PCT/US2012/063343; dated Jan. 15, 2014.
Notice of Allowance for U.S. Appl. No. 14/023,023 dated Apr. 11, 2014.
Notice of Allowance for U.S. Appl. No. 14/023,056 dated Apr. 29, 2014.
Notice of Allowance for U.S. Appl. No. 14/311,806 dated Dec. 28, 2016.
Notice of Allowance for U.S. Appl. No. 14/311,998 dated Dec. 22, 2015.
Notice of Allowance for U.S. Appl. No. 14/311,998 dated Jan. 21, 2016.
Notice of Allowance for U.S. Appl. No. 14/634,035 dated Mar. 30, 2016.
Notice of Allowance for U.S. Appl. No. 14/634,158 dated Jan. 11, 2016.
Notice of Allowance for U.S. Appl. No. 15/074,425 dated May 8, 2020.
Notice of Allowance for U.S. Appl. No. 15/093,365 dated Jun. 28, 2019.
Notice of Allowance for U.S. Appl. No. 15/188,423 dated Dec. 28, 2018.
Notice of Allowance for U.S. Appl. No. 15/421,921 dated Mar. 14, 2018.
Notice of Allowance for U.S. Appl. No. 16/009,006 dated Jul. 31, 2019.
Office Action for U.S. Appl. No. 14/023,023 dated Mar. 4, 2014.
Office Action for U.S. Appl. No. 14/023,056 dated Nov. 21, 2013.
Office Action for U.S. Appl. No. 14/311,806 dated Jun. 10, 2016.
Office Action for U.S. Appl. No. 14/311,998 dated Feb. 20, 2015.
Office Action for U.S. Appl. No. 14/311,998 dated Oct. 7, 2015.
Office Action for U.S. Appl. No. 14/634,035 dated Aug. 28, 2015.
Office Action for U.S. Appl. No. 14/634,035 dated Dec. 10, 2015.
Office Action for U.S. Appl. No. 14/634,035 dated Mar. 30, 2016.
Office Action for U.S. Appl. No. 15/074,425 dated Feb. 26, 2018.
Office Action for U.S. Appl. No. 15/074,425 dated May 10, 2017.
Office Action for U.S. Appl. No. 15/074,425 dated Nov. 27, 2018.
Office Action for U.S. Appl. No. 15/074,425 dated Oct. 4, 2019.
Office Action for U.S. Appl. No. 15/093,365 dated Dec. 17, 2018.
Office Action for U.S. Appl. No. 15/093,365 dated Nov. 16, 2017.
Office Action for U.S. Appl. No. 15/188,423 dated Jul. 20, 2018.
Office Action for U.S. Appl. No. 15/188,423 dated Oct. 23, 2017.
Office Action for U.S. Appl. No. 15/188,423 dated Oct. 30, 2018.
Office Action for U.S. Appl. No. 15/421,921 dated Sep. 27, 2017.
Office Action for U.S. Appl. No. 16/009,006 dated Dec. 3, 2018 .
Office Action for U.S. Appl. No. 16/367,095 dated May 28, 2020.
Statement in accordance with the Notice from the European patent Office dated Oct. 1, 2007 concerning business methods (OJ EPO Nov. 2007, 592-593, (XP002456414) 1 page.
U.S. Appl. No. 12/779,636; entitled "System and Method for Using Data to Automatically Generate a Narrative Story" filed May 13, 2010.
U.S. Appl. No. 13/186,308; entitled "Method and Apparatus for Triggering the Automatic Generation of Narratives" filed Jul. 19, 2011.
U.S. Appl. No. 13/186,329; entitled "Method and Apparatus for Triggering the Automatic Generation of Narratives" filed Jul. 19, 2011.
U.S. Appl. No. 13/186,337; entitled "Method and Apparatus for Triggering the Automatic Generation of Narratives" filed Jul. 19, 2011.
U.S. Appl. No. 13/186,346; entitled "Method and Apparatus for Triggering the Automatic Generation of Narratives" filed Jul. 19, 2011.
U.S. Appl. No. 13/464,635; entitled "Use of Tools and Abstraction in a Configurable and Portable System for Generating Narratives" filed May 4, 2012.
U.S. Appl. No. 13/464,675; entitled "Configurable and Portable System for Generating Narratives" filed May 4, 2012.
U.S. Appl. No. 13/464,716; entitled "Configurable and Portable System for Generating Narratives" filed May 4, 2012.
U.S. Appl. No. 14/023,023; entitled "Method and Apparatus for Alert Validation;" filed Sep. 10, 2013.
U.S. Appl. No. 14/023,056; entitled "Method and Apparatus for Situational Analysis Text Generation;" filed Sep. 10, 2013.
U.S. Appl. No. 14/027,684; entitled "Method, Apparatus, and Computer Program Product for User-Directed Reporting;" filed Sep. 16, 2013.
U.S. Appl. No. 14/027,775; entitled "Method and Apparatus for Interactive Reports;" filed Sep. 16, 2013.
U.S. Appl. No. 14/311,806; entitled Method and Apparatus for Alert Validation; In re: Reiter, filed Jun. 23, 2014.
U.S. Appl. No. 14/311,998, entitled Method and Apparatus for Situational Analysis Text Generation; In re: Reiter; filed Jun. 23, 2014.
U.S. Appl. No. 14/634,035, entitled Method and Apparatus for Annotating a Graphical Output; In re: Reiter; filed Feb. 27, 2015.
U.S. Appl. No. 14/914,461, filed Feb. 25, 2016; In re: Reiter et al., entitled Text Generation From Correlated Alerts.
U.S. Appl. No. 15/022,420, filed Mar. 16, 2016; In re: Mahamood, entitled Method and Apparatus for Document Planning.
U.S. Appl. No. 15/074,425, filed Mar. 18, 2016; In re: Reiter, entitled Method and Apparatus for Situational Analysis Text Generation.
U.S. Appl. No. 15/093,337, filed Apr. 7, 2016; In re: Reiter, entitled Method and Apparatus for Referring Expression Generation.
U.S. Appl. No. 15/093,365, filed Apr. 7, 2016; In re: Logan et al., entitled Method and Apparatus for Updating a Previously Generated Text.
U.S. Appl. No. 15/188,423, filed Jun. 21, 2016; In re: Reiter, entitled Method and Apparatus for Annotating a Graphical Output.
U.S. Appl. No. 15/421,921, filed Feb. 1, 2017; In re: Reiter, entitled Method and Apparatus for Alert Validation.

METHOD AND APPARATUS FOR UPDATING A PREVIOUSLY GENERATED TEXT

CROSS-REFERENCE TO RELATED APPLICATIONS

This application is a continuation of U.S. application Ser. No. 15/093,365, titled "METHOD AND APPARATUS FOR UPDATING A PREVIOUSLY GENERATED TEXT," filed Apr. 7, 2016, which is a continuation of U.S. application Ser. No. 14/634,158, titled "METHOD AND APPARATUS FOR UPDATING A PREVIOUSLY GENERATED TEXT," filed Feb. 27, 2015, which is a continuation of International Application No. PCT/US2012/061051, filed Oct. 19, 2012, which claims priority to International Application No. PCT/US2012/053115, filed Aug. 30, 2012 and International Application No. PCT/US2012/053127, filed Aug. 30, 2012, the contents of which are hereby incorporated herein by reference in their entirety.

TECHNOLOGICAL FIELD

Embodiments of the present invention relate generally to natural language generation technologies and, more particularly, relate to a method, apparatus, and computer program product for updating previously generated text.

BACKGROUND

In some examples, a natural language generation (NLG) system is configured to transform raw input data that is expressed in a non-linguistic format into a format that can be expressed linguistically, such as through the use of natural language. For example, raw input data may take the form of a value of a stock market index over time and, as such, the raw input data may include data that is suggestive of a time, a duration, a value and/or the like. Therefore, an NLG system may be configured to input the raw input data and output text that linguistically describes the value of the stock market index; for example, "securities markets rose steadily through most of the morning, before sliding downhill late in the day."

Data that is input into a NLG system may be provided in, for example, a recurrent formal structure. The recurrent formal structure may comprise a plurality of individual fields and defined relationships between the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information. In some examples, the output of the NLG system is text in a natural language (e.g. English, Japanese or Swahili), but may also be in the form of synthesized speech.

BRIEF SUMMARY

In some example embodiments, a method is provided that comprises generating a new message for each updateable data element based on a predetermined indication. The method of this embodiment may also include determining a classification for each new message by comparing each new message with a corresponding message that describes earlier behavior of the updateable data element. The method of this embodiment may also include generating an additional document plan tree that contains at least a portion of the new messages. The method of this embodiment may also include combining the additional document plan tree with an original document plan tree.

In further example embodiments, an apparatus is provided that includes at least one processor and at least one memory including computer program code with the at least one memory and the computer program code being configured, with the at least one processor, to cause the apparatus to at least generate a new message for each updateable data element based on a predetermined indication. The at least one memory and computer program code may also be configured to, with the at least one processor, cause the apparatus to determine a classification for each new message by comparing each new message with a corresponding message that describes earlier behavior of the updateable data element. The at least one memory and computer program code may also be configured to, with the at least one processor, cause the apparatus to generate an additional document plan tree that contains at least a portion of the new messages. The at least one memory and computer program code may also be configured to, with the at least one processor, cause the apparatus to combine the additional document plan tree with an original document plan tree.

In yet further example embodiments, a computer program product may be provided that includes at least one non-transitory computer-readable storage medium having computer-readable program instructions stored therein with the computer-readable program instructions including program instructions configured to generate a new message for each updateable data element based on a predetermined indication. The computer-readable program instructions may also include program instructions configured to determine a classification for each new message by comparing each new message with a corresponding message that describes earlier behavior of the updateable data element. The computer-readable program instructions may also include program instructions configured to generate an additional document plan tree that contains at least a portion of the new messages. The computer-readable program instructions may also include program instructions configured to combine the additional document plan tree with an original document plan tree.

In yet further example embodiments, an apparatus is provided that includes means for generating a new message for each updateable data element based on a predetermined indication. The apparatus of this embodiment may also include means for determining a classification for each new message by comparing each new message with a corresponding message that describes earlier behavior of the updateable data element. The apparatus of this embodiment may also include means for generating an additional document plan tree that contains at least a portion of the new messages. The apparatus of this embodiment may also include means for combining the additional document plan tree with an original document plan tree.

In some example embodiments, a method is provided that comprises generating a new message for each updateable data element during an update time window. The method of this embodiment may also include updating an original document plan tree such that is comprises each of the new messages. The method of this embodiment may also include causing an updated output text to be generated based on the original document plan tree.

In further example embodiments, an apparatus is provided that includes at least one processor and at least one memory including computer program code with the at least one memory and the computer program code being configured, with the at least one processor, to cause the apparatus to at least generate a new message for each updateable data element during an update time window. The at least one memory and computer program code may also be configured to, with the at least one processor, cause the apparatus to update an original document plan tree such that is comprises each of the new messages. The at least one memory and computer program code may also be configured to, with the at least one processor, cause the apparatus to cause an updated output text to be generated based on the original document plan tree.

In yet further example embodiments, a computer program product may be provided that includes at least one non-transitory computer-readable storage medium having computer-readable program instructions stored therein with the computer-readable program instructions including program instructions configured to generate a new message for each updateable data element during an update time window. The computer-readable program instructions may also include program instructions configured to update an original document plan tree such that is comprises each of the new messages. The computer-readable program instructions may also include program instructions configured to cause an updated output text to be generated based on the original document plan tree.

In yet further example embodiments, an apparatus is provided that includes means for generating a new message for each updateable data element during an update time window. The apparatus of this embodiment may also include means for updating an original document plan tree such that it comprises each of the new messages. The apparatus of this embodiment may also include means for causing an updated output text to be generated based on the original document plan tree.

BRIEF DESCRIPTION OF THE DRAWINGS

Figure 1:
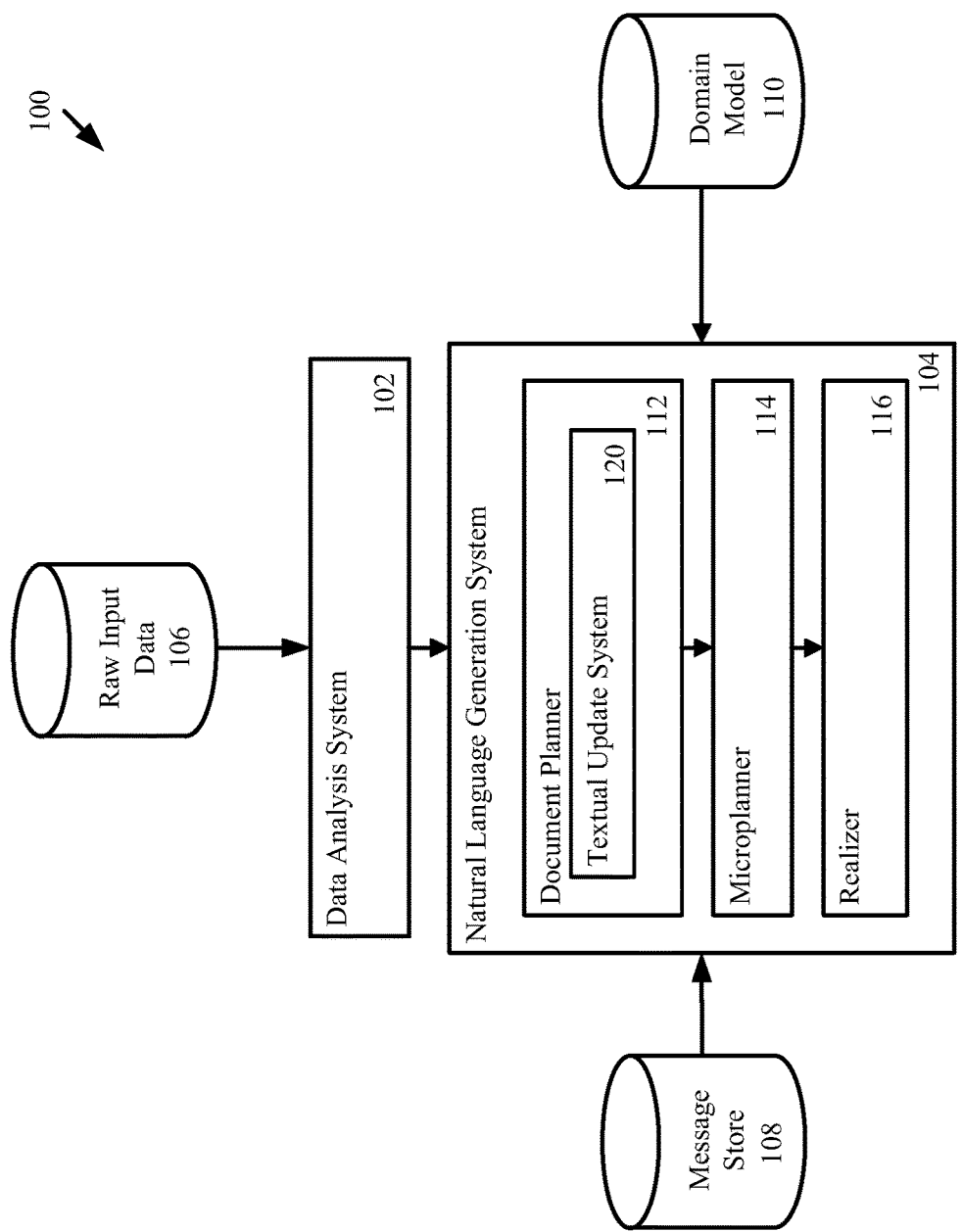
Figure 2:
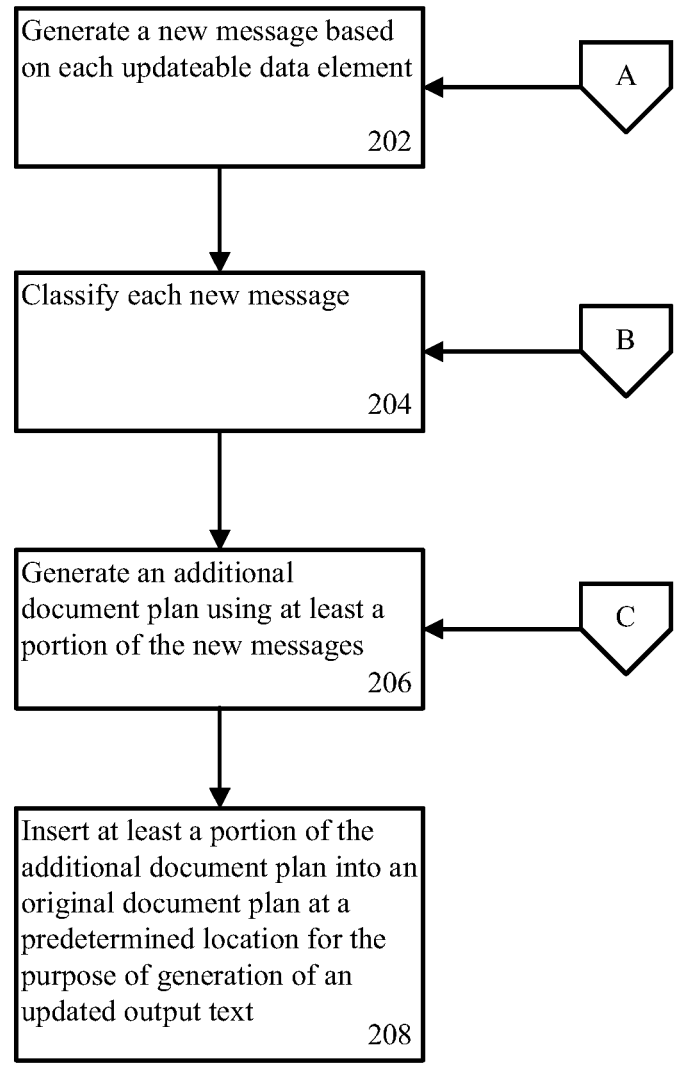
Figure 6:
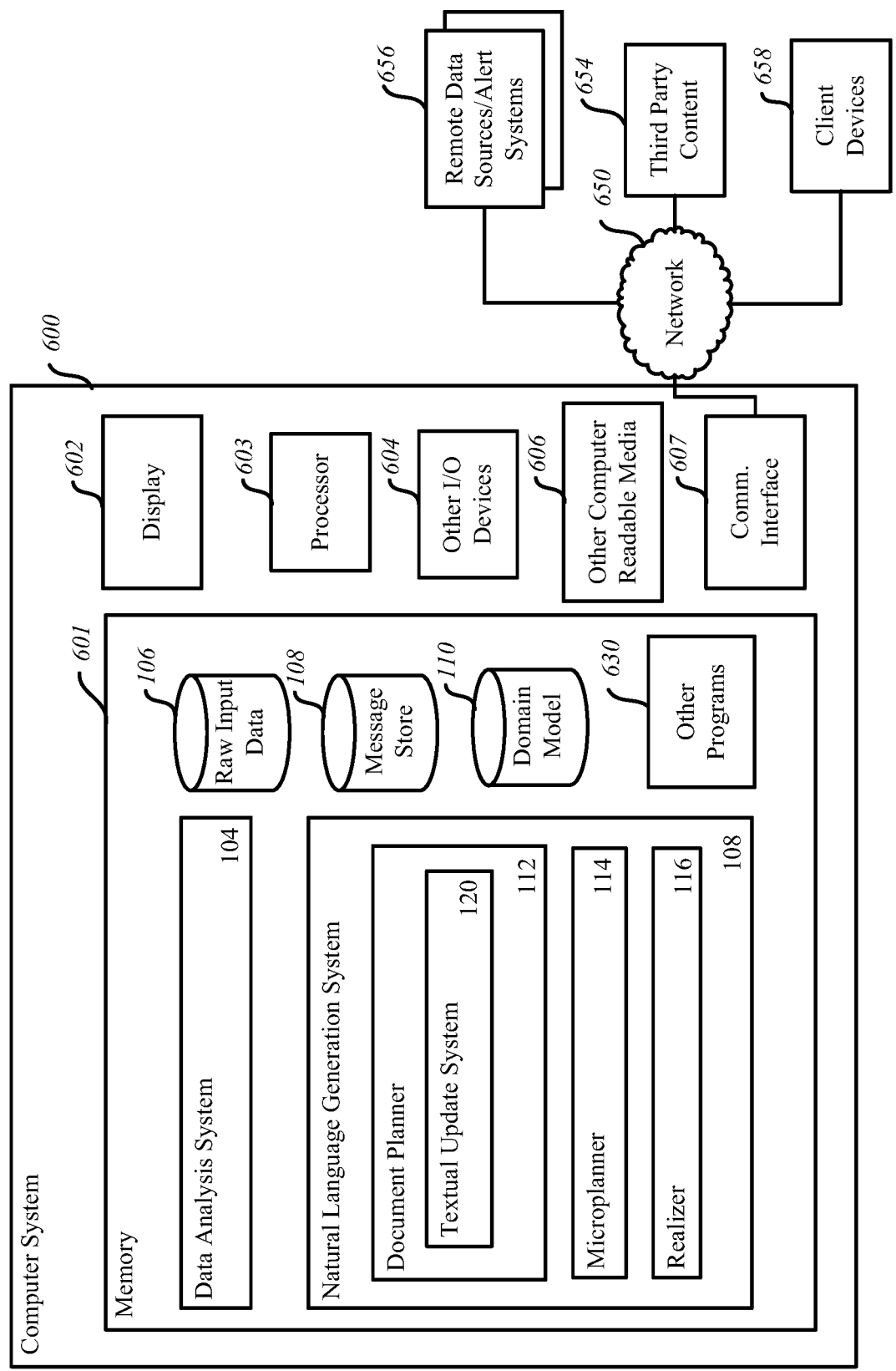
Figure 7:
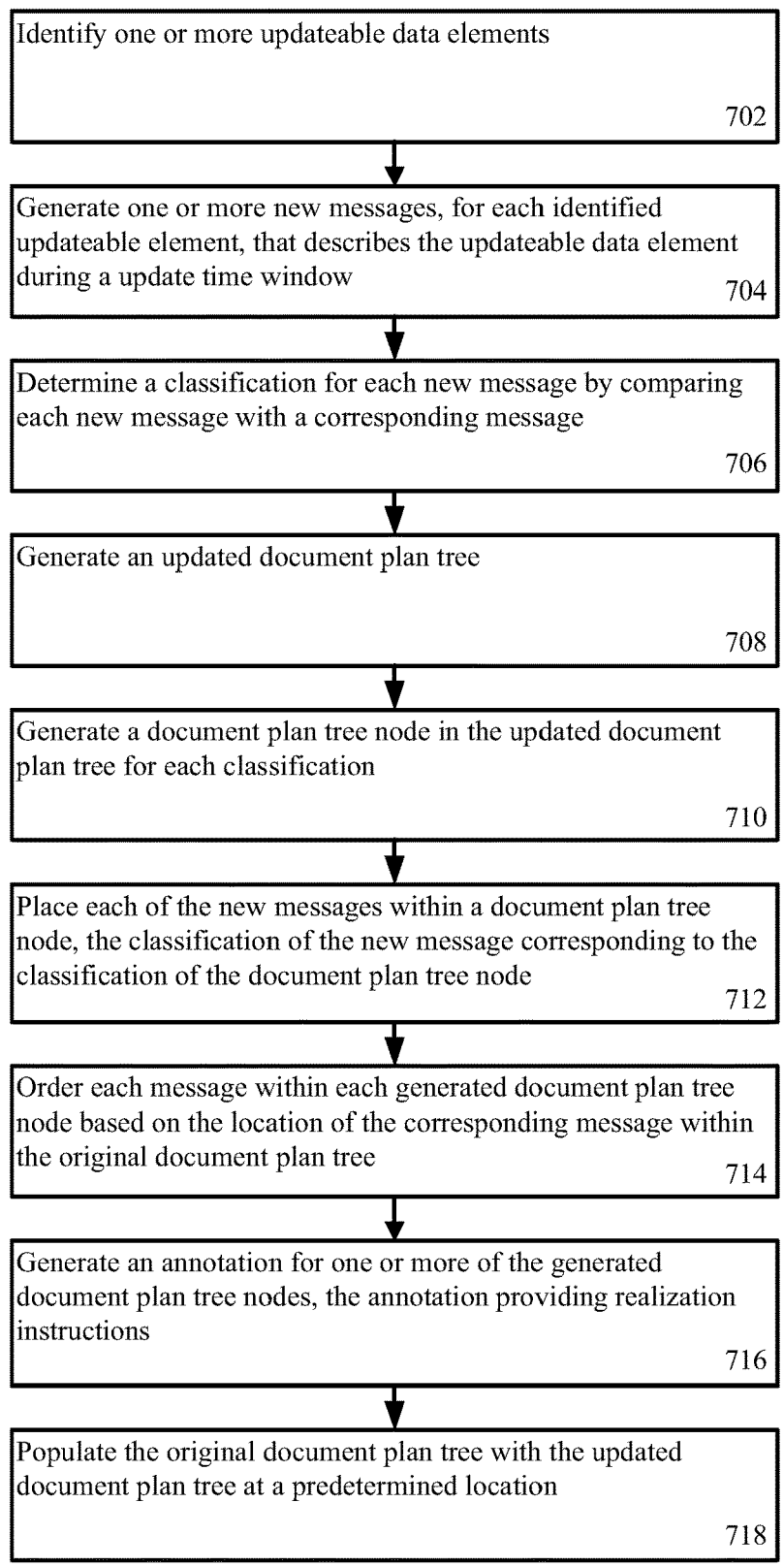

Having thus described embodiments of the invention in general terms, reference will now be made to the accompanying drawings, which are not necessarily drawn to scale, and wherein:

FIG. 1 is a schematic representation of an output text update system that may benefit from some example embodiments of the present invention;

FIGS. 2-5 illustrate flowcharts that may be performed by an output text update system in accordance with some example embodiments of the present invention;

FIG. 6 illustrates a block diagram of an apparatus that embodies an output text update system in accordance with some example embodiments of the present invention; and FIG. 7 illustrates a flowchart that may be performed by an output text update system in accordance with some example embodiments of the present invention.

DETAILED DESCRIPTION

Example embodiments will now be described more fully hereinafter with reference to the accompanying drawings, in which some but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

In some examples, natural language generation systems are configured to produce textual outputs that describe complex systems, such as, but not limited to, the generation of text relating to complex machinery, clinical summaries, financial summaries, weather reports and/or the like. In many instances, a user of a natural language generation system may otherwise be required to interpret data, symbols or other information in order to make a decision or otherwise gain an understanding of a current context, a situation, an alert condition or an event relating to a complex system. In order to make such a decision or to otherwise react to an event, a user may need to obtain an awareness (e.g. situational awareness) of the current context (e.g. both at the time of an event and at a time subsequent to the event), the situation, the alert condition or the event related to the complex system before taking an action.

Accurate mental models are one of the prerequisites for achieving situational awareness. A mental model can be described as a set of well-defined, highly-organized yet dynamic knowledge structures developed over time from experience. As such, in order to assist a user, such as a decision maker, in analyzing a complex system, an output text (e.g. situational analysis text or an alert validation text) may be generated, as is described in both PCT/US2012/053115 filed Aug. 30, 2012 and PCT/US2012/053127 filed Aug. 30, 2012, which are incorporated by reference in their entirety herein. However, the output text may be generated at a time in which a triggering event occurred or at some other time in the past that is prior to review by a user. Such a delay may result in the information contained in the output text becoming stale or otherwise outdated. For example, a doctor investigating a heart rate alarm may receive an output text describing related data (e.g., blood pressure, respiration rate, or the like), actions which could affect heart rate (e.g., medication, surgery, or the like), and/or background information (e.g., genetics, medical conditions or the like) at the time of the heart rate alarm. However, that text may not contain all of the relevant information should a doctor review the output text 30 minutes after the heart rate alarm was triggered.

As such, in order to be useful to a reader in providing situational awareness, the output text may need to be updated to account for the behavior of the complex system in the time period after the triggering event or after an output text was last reviewed. For example, an output text may be updated in a manner that highlights how the behavior of one or more systems within the complex system has changed since the output text was first produced. For example, if an original alert was generated in response to the heart rate of a patient being dangerously high, then it would be useful for a reader of an output text to know whether the heart rate has remained at its current high level, increased to an even more dangerous level or decreased to a safe level (e.g. baseline) since the time of the alarm.

Consequently, the example method, apparatus and computer program product described herein is configured to produce updates for previously generated output texts based on updateable data elements analyzed over an update time window (e.g. a set time period, a fixed time interval, a user defined time period and/or the like) to provide a user, group of users or other operator with situational awareness of an event, a current status, a happening or the like. In some example embodiments and at a time that is subsequent to the generation of the original text, one or more updateable data elements (e.g. a state, behavior, happening, and/or occurrence of a data channel that may be described by one or more original messages) may be determined. Based on the located one or more updateable data elements, new messages may be constructed that analyze or otherwise describe the updateable data elements over the update time window. The new messages may then be compared with an original message, such as a most recent message, that describes the updateable data element to determine any changes over the update time window. Specifications may then be added to the new messages to linguistically highlight the results of the comparison. In some example embodiments, an additional document plan containing the new messages is added to the original document plan and the resultant document plan is configured to be processed by a microplanner and a realizer to generate an updated text. Alternatively or additionally, instead of the new messages populating an additional document plan, the new messages may replace or may otherwise be combined with the original messages that describe the same updateable data element in the original document plan.

FIG. 1 is an example block diagram of example components of an example output text update environment 100. In some example embodiments, the output text update environment 100 comprises a data analysis system 102, a natural language generation system 104, and one or more data sources, such as but not limited to, one or more of raw input data 106, a message store 108 and/or a domain model 110. The data analysis system 102 and/or the natural language generation system 104 may take the form of, for example, a code module, a component, circuitry and/or the like. The components of the output text update environment 100 are configured to provide various logic (e.g. code, instructions, functions, routines and/or the like) and/or services related to the generation of an updated output text.

In some example embodiments, a natural language generation system, such as natural language generation system 104, is configured to generate words, phrases, sentences, text or the like which may take the form of a natural language text referred to herein as an original output text. The natural language generation system 104 comprises a document planner 112, a microplanner 114 and/or a realizer 116 in some example embodiments. The natural language generation system 104 may also be in data communication with the raw input data 106, message store 108, and/or domain model 110. Other natural language generation systems may be used in some example embodiments, such as a natural language generation system as described in Building Natural Language Generation Systems by Ehud Reiter and Robert Dale, Cambridge University Press (2000), which is incorporated by reference in its entirety herein.

In some example embodiments, and during the generation of the original text, a data analysis system 102 may be configured to instantiate or otherwise build one or more original messages based on the raw input data 106. Raw input data may include data such as, but not limited to, time series data that captures variations across time (e.g. profits, rainfall amounts, temperature or the like), spatial data that indicates variation across location (e.g. rainfall in different regions), spatial-temporal data that combines both time series data and spatial data (e.g. rainfall across time in different geographical output areas), a previously generated text and/or the like. The raw input data contained or otherwise made accessible by the raw input data 106 may be provided in the form of numeric values for specific parameters across time and space, but the raw input data may also contain alphanumeric symbols, such as the RDF notation used in the semantic web, or the content of database fields. The raw input data 106 may be received from a plurality of sources and, as such, data received from each source, sub source or data that is otherwise related may be grouped into or otherwise referred to as a data channel.

In some examples, a message store 108 or knowledge pool may store the one or more original messages (e.g. original messages that describe updateable data elements, new messages and/or the like) that are received from or instantiated by the data analysis system 102. In some examples the original messages may be received from one or more other sources, such as from other natural language generation systems, other remote data stores or the like. Messages are language independent data structures that correspond to informational elements in a text and/or collect together underlying data, referred to as slots, arguments or features, which can be presented within a fragment of natural language such as a phrase or sentence. Messages may be represented in various ways; for example, each slot may consist of a named attribute and its corresponding value; these values may recursively consist of sets of named attributes and their values, and each message may belong to one of a set of predefined types. The concepts and relationships that make up messages may be drawn from an ontology (e.g. a domain model 110) that formally represents knowledge about the application scenario. In some examples, the domain model 110 is a representation of information about a particular domain. For example, a domain model may contain an ontology that specifies the kinds of objects, instances, concepts and/or the like that may exist in the domain in concrete or abstract form, properties that may be predicated of the objects, concepts and the like, relationships that may hold between the objects, concepts and the like, and representations of any specific knowledge that is required to function in the particular domain. The one or more original messages stored in the message store 108 are accessible by the natural language generation system 104.

As such and in some example embodiments, the document planner 112 is configured to input one or more original messages from the message store 108 and to arrange those original messages based on a document plan. The output of the document planner 112 may be a tree-structured object, or other data structure, that is referred to herein as an original document plan tree. In some examples, the original document plan tree is configured such that the leaf nodes of the tree may contain the original messages, and the intermediate nodes of the tree structure object indicate how the subordinate nodes are related (e.g. elaboration, consequence, contrast, sequence and/or the like) to each other.

The microplanner 114 is configured to construct a text specification based on the original document plan tree output from the document planner 112, such that the original document plan tree may be expressed in natural language. In some example embodiments, the microplanner 114 may convert the one or more messages in the original document plan tree into one or more phrase specifications in a text specification. In some example embodiments, the microplanner 114 may perform aggregation, lexicalization and referring expression generation. In some examples, aggregation includes, but is not limited to, determining whether two or more messages can be combined together linguistically to produce a more complex phrase specification. For example, one or more messages may be aggregated so that both of the messages can be described by a single sentence. In some examples, lexicalization includes, but is not limited to, choosing particular words for the expression of concepts and relations. In some examples, referring expression generation includes, but is not limited to, choosing how to refer to an entity so that it can be unambiguously identified by the reader.

A realizer 116 is configured to traverse a text specification output by the microplanner 114 to express the text specification in natural language. The realization process is applied to each phrase specification and further makes use of a grammar, which specifies the valid syntactic structures in the language and further provides a way of mapping from phrase specifications into the corresponding natural language sentences. The output of the process is, in some example embodiments, the original output text.

In some example embodiments, the textual update system 120 is configured to access the one or more original messages in the message store 108 and the original document plan tree in order to generate or cause the generation of an updated output text. The textual update system 120 is further configured to determine one or more updateable data elements. An updateable data element may be described by one or more original messages in the original document plan tree and, for example, may describe at least one of a state, behavior, happening, and/or occurrence of the one or more data channels. For example, an example updateable state may include detecting whether a machine was activated or not during a particular time interval and an example updateable behavior may include whether a temperature detected was rising, remaining stable or falling. In some examples, the updated text may be generated for an update time window, such as a time period that is subsequent to the original output text, a time period that is subsequent to the generation of an updated output text, a fixed time interval, a time period bounded by a triggering event, a user requested time period and/or the like. In some examples, an updated text may be generated at a fixed interval until a user indicates that he/she has read the output text.

The textual update system 120 may be configured to analyze each updateable data element, such as by using the data analysis system 102, over the time period defined by the update time window. The result of the analysis is the instantiation of a new message or messages that, in some examples, summarizes or otherwise describes the updateable data element during the update time window, identifies a significant event during the update time window (e.g. an occurrence that satisfies a threshold, is identified by the domain model as important, is flagged by the user, has a high importance level or the like), indicates an occurrence or happening during the time window and/or the like. In some example embodiments, the data analysis system 102 may use the same methods, computations or analysis used during the creation of the one or more original messages describing the updateable data element in the creation of each of the new messages.

For each new message that is generated by the data analysis system 102, the textual update system 120 may be configured to compare that new message to a corresponding message that describes the earlier behavior of the updateable data element. In some examples, the comparison occurs between the new message and the most recent message that describes or otherwise summarizes the updateable data element. For example, each updateable data element is described by one or more messages that summarize or otherwise describe how the updateable data element behaved over a certain time; as such the most recent message is the message that describes the most recent time period. As a result of the comparison, the textual update system 120 may determine or otherwise classify the comparison as having an unchanged state or an unchanged data value when compared to a baseline (e.g. a measurement, calculation, or location used as a basis for comparison provided as meta data by a domain model, user input or the like) or previous values in the updateable data element; as having a state and/or data value that are stabilizing at a baseline; as having a state that has changed; as indicating that a value of a data channel is stable; as indicating a value of data channel is changing in the same or opposite direction as indicated by the updateable data element and/or the like. Alternatively or additionally, a new message may be classified based on the nature of the change indicated by the new message, the updateable data element described by the message and/or the like.

The textual update system 120, in conjunction with the document planner 112, may then generate an additional or new document plan based on the new messages and their respective classification and/or categorization. In some examples, new messages having the same classification and/or categorization may be grouped and ordered within each group based on the order of corresponding original messages describing the updateable data elements in the original document plan, an importance, a user preference and/or the like.

The textual update system 120 may optionally add an annotation to a new message or to a grouping of messages that provides instructions or a specification for realization. In some example embodiments, this annotation may override otherwise default behavior by the microplanner 114 and/or the realizer 116. In some examples, the annotation may indicate that a new message or group of new messages is to be omitted in an instance in which the new message or groups of messages indicates that the original messages describing the updateable data element and the new message both indicate that a behavior of a data channel is stable at a baseline and/or the like. In some example cases, an annotation may indicate that a standard lexicalization should be modified. Such lexicalization modifications include, but are not limited to: if the verb is "be" change to "remain", otherwise add the adverb "still"; if the verb is "be" change to "return to", otherwise add the adverb "again"; if the verb is "be" change to "change to", otherwise leave alone unless a message-specific lexicalization is given for a state change (e.g. "start" and "stop" for a run-status state change); change the verb VV to "continue to VV"; if the verb is "be" change to "became", otherwise add "back" after the verb (e.g., "fell back to NN") and/or the like. In some examples, the annotation may result in a change in linguistic form, for example to use the linguistic form "XX stabilized at a new value of VV."

The grouped and ordered messages having appropriate annotations in the form of a new or additional document plan may then be inserted into the original document plan to form a combined or resultant document plan. In some examples, the additional document plan may be inserted in its entirety at specific location in the original document plan, such as after the first paragraph of the original document plan. However, in other embodiments the additional document plan can be merged with the original document plan, such that the new messages share a document plan tree leaf node with the corresponding earlier message. Alternatively or additionally, the original document plan may comprise an indication of where new messages should be inserted should new messages be available. The combination of the original document plan and the additional document plan may then be output to a microplanner 114 and realizer 116 for the generation of the updated output text.

By way of an example and as is described herein, the environment of FIG. 1 is configured to generate an updated output text. For example, the data analysis system 102 may receive raw input data, such as the data in the following table, that illustrates a the behavior of a primary data channel (e.g. heart rate) and a related data channel (e.g. respiration rate):

| Time | Heart Rate | Respiration Rate |
|------|------------|------------------|
| 1    | 68         | 14               |
| 2    | 72         | 15               |
| 3    | 70         | 14               |
| 4    | 70         | 14               |
| 5    | 69         | 16               |
| 6    | 72         | 15               |
| 7    | 73         | 16               |
| 8    | 68         | 13               |
| 9    | 70         | 14               |
| 10   | 71         | 15               |
| 11   | 90         | 14               |
| 12   | 110        | 14               |
| 13   | 118        | 14               |
| 14   | 116        | 15               |
| 15   | 105        | 15               |
| 16   | 92         | 14               |
| 17   | 86         | 13               |
| 18   | 80         | 14               |
| 19   | 75         | 14               |
| 20   | 72         | 15               |
| 21   | 70         | 14               |
| 22   | 71         | 13               |
| 23   | 69         | 13               |
| 24   | 71         | 14               |

As is demonstrated by the raw input data in the table above, heart rate rose to 118 beats per minute (bpm) at time point 13. As such, the data analysis system 102 may be configured to generate one or more messages based on the raw input data in the one or more data channels (e.g. heart rate and respiration rate). Using the heart rate data channel as an example, a message may include portions of the raw input data, to include abstractions of the data, but may also include additional distinctions necessary for the generation of text, as the raw input data is likely to be insufficient for such a purpose. For example, using the raw input data above, a HeartRateTrend message may be instantiated such that it indicates heart rate rose to 118 at time point 13 and also indicate that a baseline heart rate is typically between 50-75, an Event message may be instantiated with an indication that caffeine was given at time point 10, and a RespirationRate message may indicate that the respiratory rate was stable at 15 and may further indicate that a baseline respiratory rate is 15. As such, these original messages may be arranged in a document plan, and using the microplanner 114 and the realizer 116, an original output text may be generated that recites: "the patient's heart rate jumped to 118 bpm after she was given caffeine. Respiration was stable at 15 bpm."

By way of further example, the textual update system 120 may be configured to update the original output text. As such, the textual update system 120 may initially determine that the heart rate data channel and the respiration data channel are updateable data elements because they relate to a state, behavior, happening, and/or occurrence of the heart rate and respiration rate data channels. In this case, the application of caffeine would not represent an updatable data element because it is an event. In examples where caffeine was given continuously intravenously, a state indicating whether caffeine was being currently administered or not could be updateable. In this example, the textual update system 120, in conjunction with the data analysis system 102, may determine that the heart rate returned to 70 bpm and therefore, the textual update system 120 would create or otherwise have access to a new message that indicates that heart rate returned to 70 bpm. The textual update system 120 may further determine that respiration rate remained stable at 15 and then may create or otherwise have access to a new message indicating as such.

The new messages may then be classified or otherwise categorized. The new message relating to heart rate may be classified such that the classification indicates that the behavior of the updateable data element has changed, when compared to the previous message described the data element (e.g. HeartRateTrend message that indicates that heart rate rose to 118 bpm), and is stabilizing to the baseline. The new message relating to respiration may be classified as unchanged at the baseline, because when compared to the previous message, the respiration rate has remained the same. Based on the classification, the new messages may be added to an additional document plan. As such, the textual update system 120 may annotate the new messages with realization instructions. In this case the new message relating to heart rate may be annotated such the verb "be" is changed to "return to", because the heart rate is returning to a baseline and the new message relating to respiration may be omitted because both the original message that described the updateable data element and the new message indicated a stable behavior of the updateable data element at a determined baseline.

The textual update system 120, in conjunction with the document planner 112, may cause the additional document plan to be inserted into the original document plan, such that the original document plan can be processed by the microplanner 114 and the realizer 116 to generate an updated output text. In some examples, the updated output text may recite: "The patient's heart rate jumped to 118 bpm after was given caffeine. Respiration was stable at 15 bpm. Afterwards, heart rate returned to 70 bpm."

FIGS. 2-5 illustrate an example implementation of the textual update system 120 according to some example embodiments, as such; the example implementation should not be construed as limiting the embodiments described herein to the example implementation. As is shown with respect to FIG. 2, at block 202, the natural language generation system 104, the textual update system 120 or the like is configured to generate a new message based on each updateable data element. The generation of new messages is further explained with reference to FIG. 3. At block 204, the natural language generation system 104, the textual update system 120 or the like is configured to classify each new message. The classification of each new message is further explained with reference to FIG. 4. At block 206, the natural language generation system 104, the textual update system 120 or the like is configured to generate an additional document plan using at least a portion of the new messages. The generation of the additional document plan is further explained with reference to FIG. 5. At block 208, the natural language generation system 104, the textual update system 120 or the like is configured to insert at least a portion the additional document plan into an original document plan at a predetermined location for the purpose of generation of an output text by way of the microplanner 114 and the realizer 116.

Figure 3:
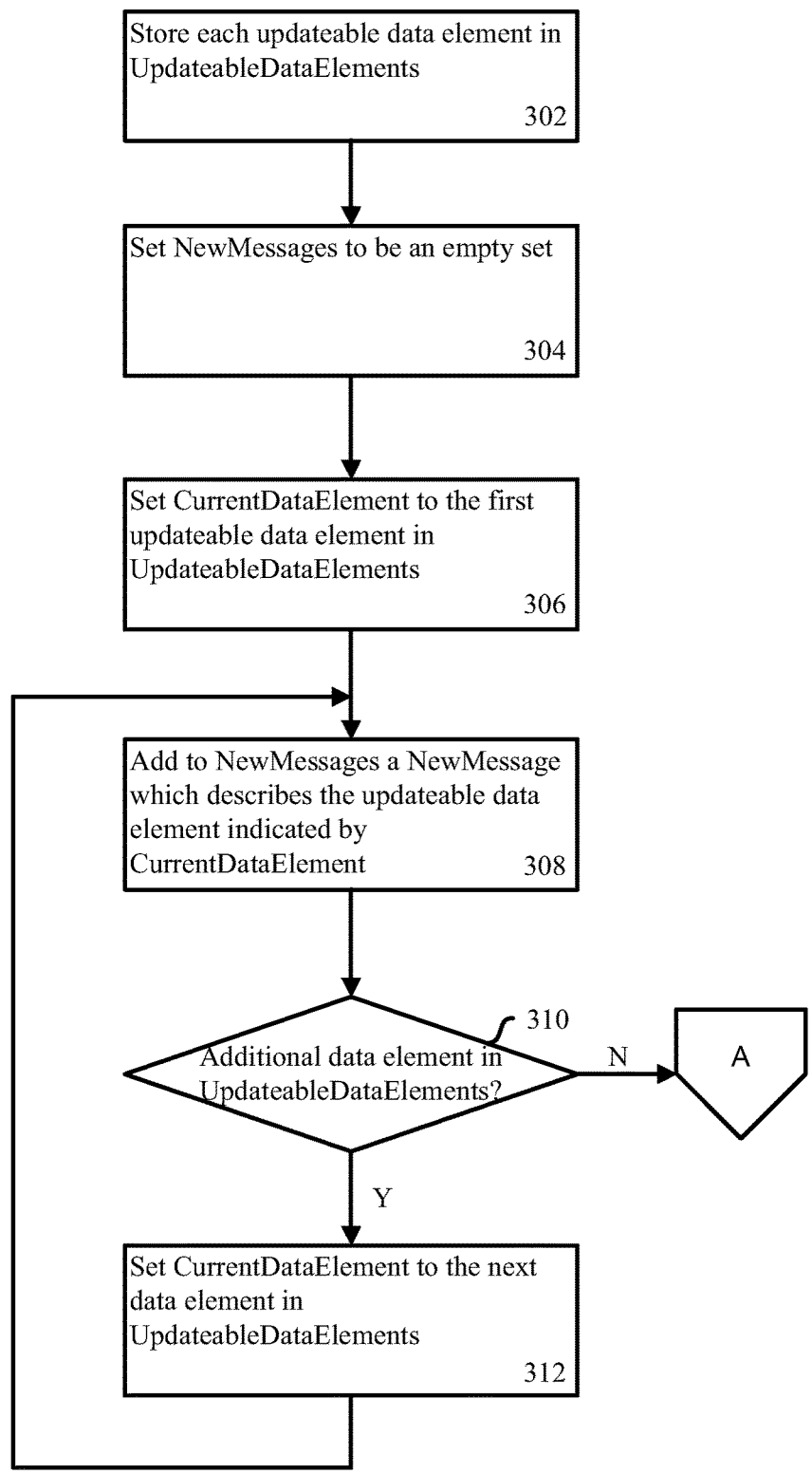

FIG. 3 is an example flowchart that illustrates the generation of a new message according to some example embodiments. At block 302, each updateable data element is stored in a data structure called UpdateableDataElements. At block 304, a data structure NewMessages is initialized as an empty set. A data structure CurrentDataElement may also be initialized and contains a pointer to the updateable data elements stored in UpdateableDataElements.

Blocks 306-312 illustrates a for loop that is configured to add at least one new message to NewMessages that describes or otherwise summarizes each updateable data element stored in UpdateableDataElements and referred to by CurrentDataElement. At block 306, CurrentDataElement is set to a first stored updateable data element. At block 308, at least one new message that describes the currently selected updateable data element in UpdateableDataElements is added to NewMessages. At decision block 310, it is determined whether there is an additional updateable data element in UpdateableDataElements. If so, then at block 310, CurrentDataElement is set to the next updateable data element and the process loops back to block 308. If there is not an additional updateable data element in UpdateableDataElements at decision block 310, then the process ends.

Figure 4:
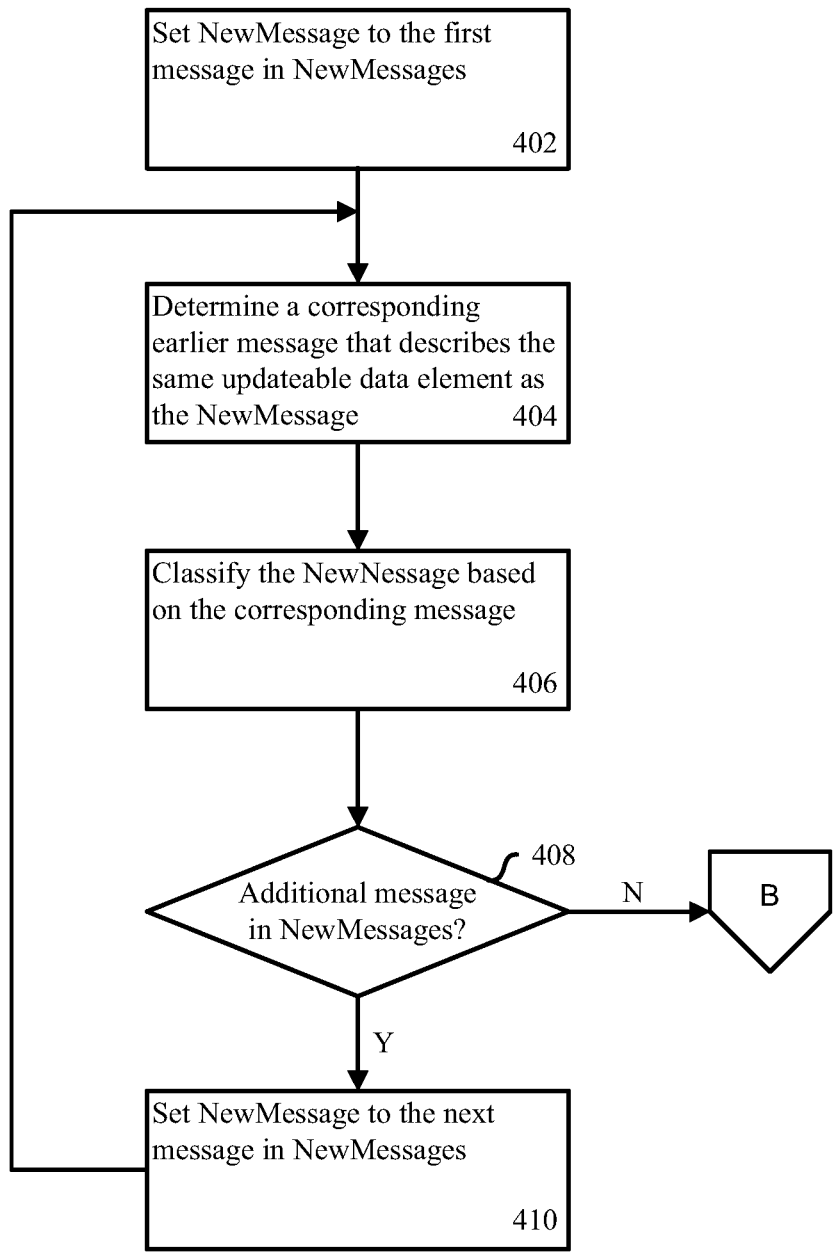

FIG. 4 is an example flowchart that illustrates the classification of a new message according to some example embodiments. Blocks 402-410 illustrate a for loop that is configured to classify each new message that is stored in the data structure NewMessages. At block 402, NewMessage is set to the first message in NewMessages in the data structure. At block 404, a corresponding earlier message that describes the same updateable data element as the NewMessage is determined. At block 406, the NewMessage is classified based on a comparison between the NewMessage and an original message that describes the updateable data element. In some examples, the comparison occurs between the NewMessage and the most recent original message that describes or otherwise summarizes the updateable data element. For example, each updateable data element is described by one or more messages that summarize or otherwise describe how the updateable data element behaved over a certain time, as such the most recent message is the message that describes the most recent time period. At block 408, it is determined whether there is an additional message in NewMessages. If so, then at block 410, NewMessage is set to the next message in NewMessages and the process loops back to block 404. If it is determined that there is not an additional message in NewMessages then the process ends.

Figure 5:
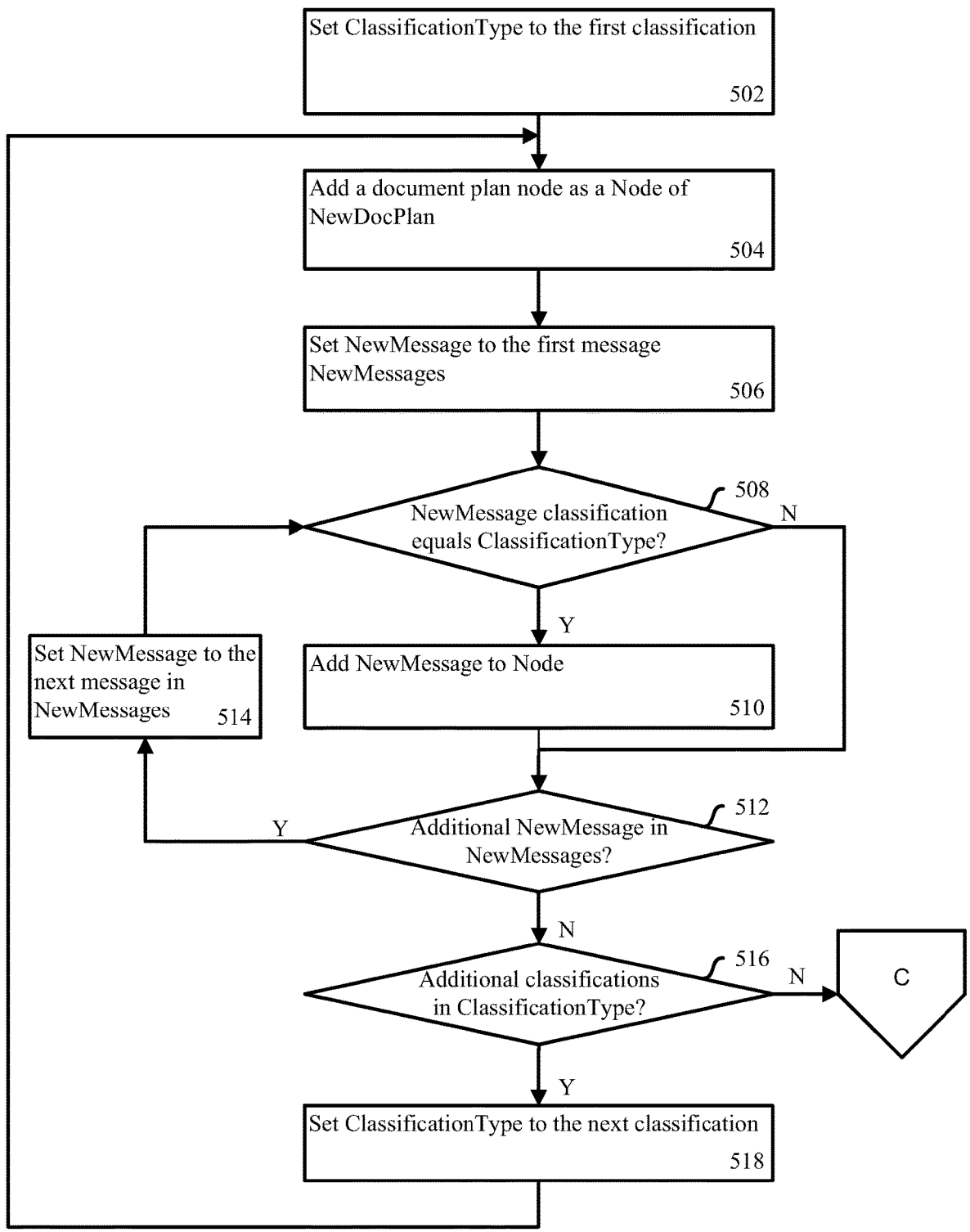

FIG. 5 is an example flowchart that illustrates the generation of an additional document plan according to some example embodiments. Blocks 502-518 illustrate a for loop that is configured to add a document plan node, for each classification type, to a newly created document plan referred to as an additional document plan. At block 502, a variable ClassificationType, that is set to equal a classification, such as the classifications used with respect to FIG. 4, is set to the first of the classifications. At block 504, a document plan as added as a new Node of the NewDocPlan (e.g. the additional document plan). As such, in some examples a document plan node is added for each categorization; however in alternate embodiments a document plan node may be added for each message type, updateable data element and/or the like.

Blocks 506-514 illustrate a for loop that is configured to loop through each message in NewMessages, which contains the set of message that were generated in FIG. 3 and were classified in FIG. 4, and add each of the messages to a document plan node in an instance in which the message and the document plan node share a corresponding classification type. At block 506, NewMessage is set the first message in NewMessages. At decision block 508, it is determined whether NewMessage classification equals ClassificationType. If so, then the NewMessage currently selected by NewMessage is added to the currently selected Node, otherwise the process continues at block 512. At decision block 512, it is determined whether there are additional messages in NewMessages. If so, then at block 514, NewMessage is set to the next message in NewMessages and the process loops back to decision block 508. If there are not any additional messages in NewMessages, then at decision block 516, it is determined whether there are any remaining classification types in the data structure ClassificationType. If so, then at block 518, the ClassificationType is set to the next classification and the process loops back to block 504. If it is determined that there are not any remaining classification types in the data structure ClassificationType then the process ends.

FIG. 6 is an example block diagram of an example computing device for practicing embodiments of an example output text update system. In particular, FIG. 6 shows a computing system 600 that may be utilized to implement an output text update environment 100 having a data analysis system 102; a natural language generation system 104 including, in some examples, a document planner 112, a microplanner 114 and/or a realizer 116; and/or an optional user interface (not shown). One or more general purpose or special purpose computing systems/devices may be used to implement the data analysis system 102 and/or the natural language generation system 104. In addition, the computing system 600 may comprise one or more distinct computing systems/devices and may span distributed locations. In some example embodiments, the data analysis system 102 and/or the natural language generation system 104 may be configured to operate remotely via the network 650. In some example embodiments, a pre-processing module or other module that requires heavy computational load may be configured to perform that computational load and thus may be on a remote device or server. For example, the data analysis system 102 may be accessed remotely. Furthermore, each block shown may represent one or more such blocks as appropriate to a specific example embodiment. In some cases one or more of the blocks may be combined with other blocks. Also, the data analysis system 102 and/or the natural language generation system 104 may be implemented in software, hardware, firmware, or in some combination to achieve the capabilities described herein.

In the example embodiment shown, computing system 600 comprises a computer memory ("memory") 601, a display 602, one or more processors 603, input/output devices 604 (e.g., keyboard, mouse, CRT or LCD display, touch screen, gesture sensing device and/or the like), other computer-readable media 605, and communications interface 606. The processor 603 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 3 as a single processor, in some embodiments the processor 603 comprises a plurality of processors. The plurality of processors may be in operative communication with each other and may be collectively configured to perform one or more functionalities of the output text update system as described herein.

The data analysis system 102 and/or the natural language generation system 104 are shown residing in memory 601. The memory 601 may comprise, for example, transitory and/or non-transitory memory, such as volatile memory, non-volatile memory, or some combination thereof. Although illustrated in FIG. 6 as a single memory, the memory 601 may comprise a plurality of memories. The plurality of memories may be embodied on a single computing device or may be distributed across a plurality of computing devices collectively configured to function as the output text update system. In various example embodiments, the memory 601 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, some or all of the components of the data analysis system 102 and/or the natural language generation system 104 may be stored on and/or transmitted over the other computer-readable media 605. The components of the data analysis system 102 and/or the natural language generation system 104 preferably execute on one or more processors 603 and are configured to generate updated output texts, as is described herein.

Alternatively or additionally, other code or programs 630 (e.g., an administrative interface, a Web server, and the like) and potentially other data repositories, such as data repository 640, also reside in the memory 601, and preferably execute on one or more processors 603. Of note, one or more of the components in FIG. 3 may not be present in any specific implementation. For example, some embodiments may not provide other computer readable media 605 or a display 602.

The data analysis system 102 and/or the natural language generation system 104 are further configured to provide functions such as those described with reference to FIG. 1. the data analysis system 102 and/or the natural language generation system 104 may interact with the network 650, via the communications interface 606, with remote data sources/alert systems 656 (e.g. remote reference data, remote performance data, remote aggregation data, remote alert systems and/or the like), third-party content providers 654 and/or client devices 658. The network 650 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instance the network 650 may take the form of the internet or may be embodied by a cellular network such as an LTE based network. In this regard, the communications interface 606 may be capable of operating with one or more air interface standards, communication protocols, modulation types, access types, and/or the like. The client devices 658 include desktop computing systems, notebook computers, mobile phones, smart phones, personal digital assistants, tablets and/or the like.

In an example embodiment, components/modules of the data analysis system 102 and/or the natural language generation system 104 are implemented using standard programming techniques. For example, the data analysis system 102 and/or the natural language generation system 104 may be implemented as a "native" executable running on the processor 603, along with one or more static or dynamic libraries. In other embodiments, the data analysis system 102 and/or the natural language generation system 104 may be implemented as instructions processed by a virtual machine that executes as one of the other programs 630. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the data analysis system 102 and/or the natural language generation system 104, such as by using one or more application programming interfaces can be made available by mechanisms such as through application programming interfaces (API) (e.g. C, C++, C #, and Java); libraries for accessing files, databases, or other data repositories; through scripting languages such as XML; or through Web servers, FTP servers, or other types of servers providing access to stored data. The raw input data 106, message store 108 and/or the domain model 110 may be implemented as one or more database systems, file systems, or any other technique for storing such information, or any combination of the above, including implementations using distributed computing techniques. Alternatively or additionally, the raw input data 106, message store 108 and/or the domain model 110 may be local data stores but may also be configured to access data from the remote data sources/alert systems 656.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the data analysis system 102 and/or the natural language generation system 104 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIG. 7 is a flowchart illustrating an example method for generating an updated output text. As is shown in operation 702, an apparatus may include means, such as the data analysis system 102, the natural language generation system 104, the textual update system 120, the processor 603, or the like, for identifying one or more updateable data elements. For example and as described herein, a data element is a state, behavior, happening, occurrence or the like within a data channel or data source of the system. As is shown in operation 704, an apparatus may include means, such as the data analysis system 102, the natural language generation system 104, the textual update system 120, the processor 603, or the like, for generating one or more new messages, for each identified updateable element, that describes the updateable data element during a update time window. The new messages may be generated using the same data analytics as a corresponding updateable data element. Alternatively or additionally, new data analysis may be accomplished by the data analysis system 102 that may include but is not limited to trend analysis, threshold monitoring, abstractions, summarization and/or the like.

As is shown in operation 706, an apparatus may include means, such as the natural language generation system 104, the textual update system 120, the processor 603, or the like, for determining a classification for each new message by comparing each new message with a corresponding original message that describes the same updateable data element. In some examples, the comparison occurs between the new message and the most recent message that describes or otherwise summarizes the updateable data element. For example, each updateable data element is described by one or more messages that summarize or otherwise describe how the updateable data element behaved over a certain time; as such the most recent message is the message that describes the most recent time period. As is shown in operation 708, an apparatus may include means, such as the natural language generation system 104, the textual update system 120, the processor 603, or the like, for generating an updated document plan or document plan tree. As is shown in operation 710, an apparatus may include means, such as the natural language generation system 104, the textual update system 120, the processor 603, or the like, for generating a document plan tree node in the updated document plan tree for each classification.

As is shown in operation 712, an apparatus may include means, such as the natural language generation system 104, the textual update system 120, the processor 603, or the like, for placing each of the new messages within a document plan tree node, the classification of the new message corresponding to the classification of the document plan tree node. As is shown in operation 714, an apparatus may include means, such as the natural language generation system 104, the textual update system 120, the processor 603, or the like, for ordering each message within each generated document plan tree node based on the location of the corresponding message (e.g. the most recent corresponding message) within the original document plan tree.

As is shown in operation 716, an apparatus may include means, such as the data analysis system 102, the natural language generation system 104, the textual update system 120, the processor 603, or the like, for generating an annotation for one or more of the generated document plan tree nodes, the annotation providing realization instructions. In some example embodiments, an annotation may take the form of a linguistic marker that is added to the beginning of the additional document plan tree to signify that the new messages in the additional document plan tree are an update to the messages in the original document plan tree. As is shown in operation 718, an apparatus may include means, such as the data analysis system 102, the natural language generation system 104, the textual update system 120, the processor 603, or the like, for populating the original document plan tree with the updated document plan tree at a predetermined location. The original document plan tree may then be output to a microplanner and/or a realizer for transformation in an update output text.

FIGS. 2-5 and 7 illustrate example flowcharts of the operations performed by an apparatus, such as computing system 600 of FIG. 6, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 601 of an apparatus employing an embodiment of the present invention and executed by a processor 603 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 2-5 and 7, when executed, convert a computer or processing circuitry into a particular machine configured to perform an example embodiment of the present invention. Accordingly, the operations of FIGS. 2-5 and 7 define an algorithm for configuring a computer or processor, to perform an example embodiment. In some cases, a general purpose computer may be provided with an instance of the processor which performs the algorithm of FIGS. 2-5 and 7 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described herein. Moreover, in some embodiments additional optional operations may also be included. It should be appreciated that each of the modifications, optional additions or amplifications described herein may be included with the operations herein either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus configured to programmatically transform one or more input data streams that comprise data that is at least partially expressed in a non-linguistic format into a format that can be expressed linguistically in one or more output texts, the apparatus comprising at least a processor, and a memory associated with the processor having computer coded instructions therein, with the computer coded instructions configured to, when executed by the processor, cause the apparatus to:

generate, using a processor, a first output text based on a set of messages and a relationship between the set of messages, wherein the set of messages is based on a first input data stream;

detect, using the processor, an updateable data element based on a second input data stream, the updateable data element associated with a message of the set of messages, and the second input data stream comprising raw input data that is at least partially expressed in a non-linguistic form; and generate, using the processor, an updated output text, wherein the updated output text comprises one or more natural language sentences based on at least a portion of the first output text and at least a portion of one or more new messages in the second input data stream that is associated with the updateable data element.

2. The apparatus of claim 1, wherein the relationship between the set of messages associated with the first output text is defined by an original document plan tree.

3. The apparatus of claim 2, wherein the computer coded instructions further cause the apparatus to determine a classification for each of the one or more new messages by comparing each of the one or more new messages with a corresponding message that describes earlier behavior of the updateable data element.

4. The apparatus of claim 3, wherein the computer coded instructions further cause the apparatus to generate a new document plan based on the one or more new messages and their respective classifications.

5. The apparatus of claim 3, wherein the computer coded instructions further cause the apparatus to order the one or more new messages with the same respective classification based on the order of the corresponding message that describes earlier behavior of the updateable data element in the original document plan tree.

6. The apparatus of claim 1, wherein the updateable data element is based on a predetermined indication.

7. The apparatus of claim 1, wherein the message associated with the updateable element is generated during an update time window.

8. A computer program product configured to transform one or more input data streams that comprise data that is at least partially expressed in a non-linguistic format into a format that can be expressed linguistically in one or more output texts, the computer program product comprising at least one computer readable non-transitory memory medium having program code stored thereon, the program code which when executed by an apparatus cause the apparatus at least to:

generate, using a processor, a first output text based on a set of messages and a relationship between the set of messages, wherein the set of messages is based on a first input data stream;

detect, using the processor, an updateable data element based on a second input data stream, the updateable data element associated with a message of the set of messages, and the second input data stream comprising raw input data that is at least partially expressed in a non-linguistic form; and generate, using the processor, an updated output text, wherein the updated output text comprises one or more natural language sentences based on at least a portion of the first output text and at least a portion of one or more new messages in the second input data stream that is associated with the updateable data element.

9. The computer program product of claim 8, wherein the relationship between the set of messages associated with the first output text is defined by an original document plan tree.

10. The computer program product of claim 9, wherein the program code which when executed by an apparatus further cause the apparatus to determine a classification for each of the one or more new messages by comparing each of the one or more new messages with a corresponding message that describes earlier behavior of the updateable data element.

11. The computer program product of claim 10, wherein the program code which when executed by an apparatus further cause the apparatus to generate a new document plan based on the one or more new messages and their respective classifications.

12. The computer program product of claim 10, wherein the program code which when executed by an apparatus further cause the apparatus to order the one or more new messages with the same respective classification based on the order of the corresponding message that describes earlier behavior of the updateable data element in the original document plan tree.

13. The computer program product of claim 9, wherein the updateable data element is based on a predetermined indication.

14. The computer program product of claim 9, wherein the message associated with the updateable element is generated during an update time window.

15. A method for transforming one or more input data streams that comprise data that is at least partially expressed in a non-linguistic format into a format that can be expressed linguistically in one or more output texts, the method comprising:

generating, using a processor, a first output text based on a set of messages and a relationship between the set of messages, wherein the set of messages is based on a first input data stream;

detecting, using the processor, an updateable data element based on a second input data stream, the updateable data element associated with a message of the set of messages, and the second input data stream comprising raw input data that is at least partially expressed in a non-linguistic form; and generating, using the processor, an updated output text, wherein the updated output text comprises one or more natural language sentences based on at least a portion of the first output text and at least a portion of one or more new messages in the second input data stream that is associated with the updateable data element.

16. The method of claim 15, further comprising determining a classification for each of the one or more new messages by comparing each of the one or more new messages with a corresponding message that describes earlier behavior of the updateable data element.

17. The method of claim 15, wherein the relationship between the set of messages associated with the first output text is defined by an original document plan tree.

18. The method of claim 16, further comprising ordering the one or more new messages with the same respective classification based on the order of the corresponding message that describes earlier behavior of the updateable data element in the original document.

19. The method of claim 15, wherein the updateable data element is based on a predetermined indication.

20. The method of claim 15, wherein the message associated with the updateable element is generated during an update time window.

* * * * *